United States Patent Office 3,230,254
Patented Jan. 18, 1966

3,230,254
PROCESS OF PRECIPITATING TETRACYCLINE
BASE IN CRYSTALLINE FORM
Gert Svanholm, Lyngby, Denmark, assignor to Novo
Terapeutisk Laboratorium A/S, Copenhagen, Denmark
No Drawing. Filed June 2, 1964, Ser. No. 372,079
Claims priority, application Denmark, June 17, 1963,
2,868/63
12 Claims. (Cl. 260—559)

The present invention relates to a process of precipitating tetracycline base in crystalline form.

In the preparation of tetracycline an aqueous, tetracycline-containing culture medium is subjected to a combined recovery and purification process. When this process is carried out by means of extraction, it is usual first to remove from the culture medium the mycelium of the microorganism having produced the tetracycline. Thereafter the tetracycline is extracted with an organic solvent, to which carriers have been added, if desired, at such a pH-value that as much tetracycline as possible will dissolve in the organic phase, the volume of said phase being kept considerably smaller than that of the culture medium. The resulting organic phase contains tetracycline in concentrated form, and some of the impurities which were present in the culture medium are not transferred to the organic phase, so that the tetracycline will be both concentrated and to some extent purified. The tetracycline thus purified in part is thereafter isolated from the organic phase, e.g. by extraction on water, at a pH-value at which the tetracycline is much more soluble in the aqueous phase than in the organic solvent. If use is made of extracting back on water, the volume of the extracting agent, in the present case the aqueous phase, is kept considerably smaller than the volume of the organic phase so that the tetracycline solution is further concentrated. At the same time some of the impurities which were present in the organic phase remain in said phase. In this manner a concentrated aqueous solution of tetracycline is obtained from which the main part of the impurities originally present in the culture medium have been removed.

The above mentioned extractions may be repeated until there is obtained a solution containing the tetracycline in such pure and concentrated form that it can be isolated as tetracycline base by crystallization. The free tetracycline base first crystallizing from the solution may be further purified by a series of recrystallizations or the tetracycline base may be recovered from the concentrated solution by freeze-drying.

Thus, the situation is that hitherto it has been necessary to carry out a relatively large number of purification steps in order to obtain an effective removal of impurities and a pure crystalline precipitate of tetracycline base.

When tetracycline is produced by fermentation while using a microorganism producing both tetracycline and chlortetracycline it is often desirable to take measures against the formation of chlortetracycline. It is known in various manners to suppress the formation of chlortetracycline, but one has not managed to avoid such formation completely.

It has now been found that it is possible in one single step to precipitate pure tetracycline base directly in crystalline form and in high yield from an aqueous impure tetracycline-containing solution by a simple process without simultaneously precipitating chlortetracycline, if any.

The present invention is based upon the new and surprising observation that the tetracycline base can be precipitated directly in crystalline form and in high yield and of great purity when care is taken to the effect partly that certain phosphoric or phosphorous acid esters are present in a suitable concentration in dissolved state in an organic solvent being immiscible or slightly miscible with water, partly that no calcium ions or other metal ions able to form complex compounds with tetracycline are present in the aqueous tetracycline-containing solution in such amounts that an appreciable part of the tetracycline is bound in complex form.

When observing these measures it is possible from an impure aqueous tetracycline solution to have the tetracycline crystallize in such pure state that it is directly applicable for therapeutic purposes and has simultaneously been freed of the chlortetracycline which might be present in the aqueous solution.

Consequently, the process according to the invention is characterized in adding to the aqueous tetracycline-containing solution, which is mainly free of calcium ions and other metal ions being able to form complex compounds with tetracycline, an organic solvent in which a di- or monoester of ortho-phosphoric or phosphorous acid is dissolved, and in adjusting the pH-value of the aqueous solution to 3–8, preferably 5–7, prior to or after adding the organic solvent, whereafter the crystallized tetracycline base is separated off.

Beforehand, one could not anticipate that the impurities contained in the aqueous starting solution would by this treatment remain to a large extent in the organic phase so that the crystalline precipitated tetracycline base possesses a high degree of purity.

In case the aqueous tetracycline solution also contains chlortetracycline one obtains by the instant process an effective removal of the chlortetracycline so that the resulting tetracycline crystals can immediately satisfy the demands for purity which are normally made as far as tetracycline preparations are concerned. Thus, it has turned out that when using the process according to the invention one may obtain for all practical purposes tetracycline crystals which are free of chlortetracycline even if the starting material contains even very considerable amounts of chlortetracycline.

If the aqueous tetracycline-containing starting solution only contains an insignificant amount of tetracycline the yield of pure tetracycline base is low though it is possible to obtain a precipitate of tetracycline crystals while using a solution containing tetracycline in an amount as low as about 5,000 units per milliliter. In practice the tetracycline solutions will usually contain much more tetracycline and will therefore be well-suited for the purpose of the invention.

The phosphoric and phosphorous acid esters employed must contain at least one dissociable hydrogen atom in the molecule and be soluble in the organic solvent. The required solubility is provided in that the organic radical constituting part of the ester molecule has such hydrophobic nature that the hydrophilic nature of the phosphoric or phosphorous acid part of the ester molecule is suppressed to such an extent that the ester becomes soluble in the employed organic solvent. It is easy by simple experiments to ascertain which are the esters within the defined group being applicable for the purpose of the invention. In case that use is made of diesters the two organic radicals may be identical or different. Particularly appropriate esters are the di-(2-ethylhexyl)-phosphoric acid and the dinonyl-orthophosphoric acid. When using these esters an excellent purification of the tetracycline and crystallization thereof is obtainable in good yields.

The said esters may be used in relatively varying concentrations. Ordinarily, more than 25 percent by weight will be inappropriate, e.g. due to increased viscosity of the organic phase. Usually use is made of smaller concentrations right down to about 1 percent by weight. A concentration of the esters of about 5 percent by weight gives good results in many cases. A suitable range of concentration is from 2 to 10 percent by weight.

The solvent in which the employed ester is dissolved may be chosen among a long series of organic solvents being immiscible or only slightly miscible with water. Excellent results have been obtained while using e.g. butylacetate, chloroform, amylalcohol and methylisobutyl ketone. The amount of the organic solvent depends upon the employed ester, its concentration and the amount and nature of the impurities present. It is necessary that the latter are kept dissolved in the organic solvent containing dissolved therein the employed ester in order that the tetracycline base can be caused to crystallize. In order to illustrate this state of things it may be mentioned that when using an aqueous tetracycline raw solution with a tetracycline content of 25,000 units per milliliter and butylacetate as organic solvent with a content of di-(2-ethylhexyl)-ortho-phosphoric acid in an amount of 5 percent by weight, there may be obtained a yield of crystalline tetracycline base of about 85 percent when use is made of a ratio of volume between the butylacetate and the tetracycline raw solution of 1:5.

Calcium ions and other complex forming metal ions may have been removed from the aqueous tetracycline solution prior to crystallization of the tetracycline base, e.g. by ion exchange or precipitation, or they may be kept complex bound during the crystallization. Use may be made of the last mentioned possibility in that a chelating agent having a stronger chelate-forming effect on the said metal ions than has the tetracycline is added to the aqueous tetracycline solution prior to the crystallization. A particularly well-suited chelating agent is e.g. ethylene diamine tetraacetic acid.

The present process is further illustrated in the following examples. In this connection attention is called to the fact that one tetracycline unit corresponds to 1 µg. of tetracycline hydrochloride, and that the tetracycline base crystallizes with crystal water which can only be removed by vigorous drying, e.g. at 60° C. in vacuo for 12 hours.

*Example 1*

To 100 liters of an acid aqueous concentrate of a mixture of 60 percent tetracycline and 40 percent chlortetracycline prepared by extraction of a fermentation liquid with butylacetate, to which 2.5 percent of di-(2-ethylhexyl)-phosphoric acid at neutral pH have been added and by extracting back on water acidified by the addition of phosphoric acid, there are added 24 liters of a 5 percent solution of di-(2-ethylhexyl)-phosphoric acid in butylacetate, 24 liters of a 40 percent solution of sodium ethylenediamine tetraacetic acid in water and 10 N soda lye till pH=5.5. Stirring is continued for two hours. The mixture is left overnight and is filtered whereafter the resulting precipitate is rinsed with water and butylacetate and dried in vacuo. Thereby pure crystalline tetracycline base containing less than 5 percent chlortetracycline is obtained in a yield of 70 percent which may be directly converted to tetracycline hydrochloride USP.

*Example 2*

To 89 liters of an acid aqueous raw concentrate containing 12,000 units of tetracycline per milliliter there are added while vigorously stirring 13 liters of a 40 percent solution of sodium ethylenediamine tetraacetic acid and 10 liters of a 10 percent solution of di-(2-ethylhexyl)-phosphoric acid in butylacetate, whereafter pH is adjusted to 6.4 by adding 10 N soda lye. After standing overnight a filtering process is performed and the resulting precipitate is rinsed with water and butylacetate and is dried in vacuo. The yield amounts to 1012 grams of pure tetracycline base of 885 units per milligram which can directly be converted to tetracycline hydrochloride USP.

*Example 3*

10 grams of raw tetracycline prepared by butanol extraction of culture liquid are dissolved in 100 milliliters of water and concentrated hydrochloric acid till pH=1.3, are filtered and rinsed with water till 140 milliliters of filtrate are obtained. To 130 milliliters thereof containing 4.9 grams of tetracycline and 0.3 gram of chlortetracycline and about 0.5 gram of calcium there are added 1 milliliter of di-(2-ethylhexyl)-phosphoric acid, 9 milliliters of butylacetate and 10 grams of ethylenediamine tetraacetic acid dissolved in 10 milliliters of water and 10 milliliters of 10 N soda lye, whereafter vigorous stirring is performed and the pH of the mixture is adjusted to 6.4. After crystallization has ceased the mixture is filtered and the crystals are washed with 10 milliliters of water and 10 milliliters of butylacetate. Thereby 4.76 grams of light yellow tetracycline base having an activity of 900 units per milligram of tetracycline are obtained which are directly applicable in the production of tetracycline hydrochloride USP.

*Example 4*

6 grams of raw tetracycline containing about 0.3 gram of calcium and about 2.5 grams of tetracycline are suspended in 40 milliliters of water and sulphuric acid is added till pH=1.5. The mixture is filtered and the precipitate which mainly consists of calcium sulphate is stirred into 20 milliliters of water at pH 1.5, is filtered again and is rinsed with water. Thereby 87 milliliters of filtrate are obtained to which there are added while vigorously stirring 20 milliliters of butylacetate, 1.5 grams of di-(2-ethylhexyl)-ortho-phosphoric acid and 10 N soda lye till pH=5.8. After crystallization has ceased the crystals are filtered off, washed with 10 milliliters of water and 8 milliliters of butylacetate and dried in vacuo. The yield amounts to 1.55 grams of pure tetracycline base of 1013 units of tetracycline activity per milligram which can directly be converted to tetracycline hydrochloride USP.

*Example 5*

To 250 milliliters of acid aqueous raw concentrate containing about 7 grams of tetracycline there are added 50 milliliters of butylacetate and 10 milliliters of Lensodel A (Lensodel A is prepared by Shell in Great Britain and contains as active component sodium dinonyl phosphate) and 65 milliliters of a 40 percent solution of sodium ethylenediamine tetraacetic acid whereafter the pH-value is adjusted to 5.8 while vigorously stirring. After crystallization has ceased the crystals are filtered off, washed with water and butylacetate and are dried in vacuo. The yield amounts to 73 percent tetracycline base which can directly be used in preparing tetracycline hydrochloride USP.

*Example 6*

To 200 milliliters of acid aqueous raw concentrate containing 27,000 units of tetracycline per milliliter and 5,000 units of chlortetracycline per milliliter there are added while vigorously stirring 40 milliliters of methylisobutyl ketone, 2 grams of di - (2 - ethylhexyl)-phosphoric acid, 50 milliliters of a 40 percent solution of sodium ethylenediamine tetraacetic acid and 10 N soda lye till pH=6.0. After crystallization has ceased the crystals are filtered off, washed with 15 milliliters of water and 5 milliliters of methylisobutyl ketone and dried in vacuo. The yield amounts to 4.5 grams of pure tetracycline base having an activity of 981 units per milligram which are directly applicable in preparing tetracycline hydrochloride USP.

Among other esters which have been tested and which are suitable for the purpose of the invention the following may be mentioned: decylphopshite, 2-ethylhexyl-phosphate, decylphosphate, laurylphosphate, and octyl-phenyl-phosphate.

What I claim is:

1. A process of precipitating tetracycline base in crystalline form from an aqueous tetracycline-containing solution containing at least 5,000 tetracycline units per milliliter which comprises removing from said tetracycline-containing solution, calcium ions and other metal ions capable of forming complex compounds with tetracycline by adding to said solution a chelating agent having a stronger chelate-forming effect on said ions than has tetracycline, adding to the aqueous tetracycline-containing solution an organic solvent at most only slightly miscible with water and an ester selected from the group which consists of monoesters and diesters of orthophosphoric acid and phosphorous acid dissolved in said organic solvent, and adjusting the pH-value of the aqueous solution to about 3–8, whereafter crystalline tetracycline base separates.

2. A process as defined in claim 1 wherein the concentration of said ester dissolved in said organic solvent is of the order of 2% to 10% by weight.

3. A process of precipitating tetracycline base in crystalline form from an aqueous tetracycline-containing solution containing at least 5,000 tetracycline units per milliliter which comprises removing from said tetracycline-containing solution, calcium ions and other metal ions capable of forming complex compounds with tetracyclene by adding to said solution a chelating agent having a stronger chelate-forming effect on said ions than has tetracycline, adding to the aqueous tetracycline-containing solution an organic solvent at most only slightly miscible with water and di-(2-ethylhexyl)-ortho-phosphoric acid dissolved in said organic solvent, and adjusting the pH-value of the aqueous solution to about 3–8, whereafter crystalline tetracycline base separates.

4. A process of precipitating tetracycline base in crystalline form from an aqueous tetracycline-containing solution containing at least 5,000 tetracycline units per milliliter which comprises removing from said tetracycline-containing solution, calcium ions and other metal ions capable of forming complex compounds with tetracycline by adding to said solution a chelating agent having a stronger chelate-forming effect on said ions than has tetracycline, adding to the aqueous tetracycline-containing solution an organic solvent at most only slightly miscible with water and dinonyl-ortho-phosphoric acid dissolved in said organic solvent, and adjusting the pH-value of the aqueous solution to about 3–8, whereafter crystalline tetracycline base separates.

5. A process according to claim 1, wherein ethylenediamine tetraacetic acid is used as said chelating agent.

6. In a process of precipitating tetracycline base in crystalline form from an aqueous tetracycline-containing solution containing at least 5,000 tetracycline units per milliliter and substantially free of calcium ions and other metal ions capable of forming complex compounds with tetracycline, the steps which comprise adding to said tetracycline-containing solution an organic solvent which is at most only slightly miscible with water and an ester selected from the group which consists of monoesters and diesters of ortho-phosphoric acid and phosphorous acid dissolved in said organic solvent, and adjusting the pH-value of the aqueous solution to about 3–8, whereafter crystalline tetracycline base separates.

7. A process as defined in claim 6 wherein said ester is employed in a concentration of from about 1% to about 25% by weight.

8. A process as defined in claim 6 wherein said ester is employed in a concentration of the order of 2% to 10% by weight.

9. A process as defined in claim 6 wherein the pH-value of the aqueous solution is adjusted to about 5–7.

10. A process as defined in claim 6 wherein said pH-value is adjusted prior to the addition of said organic solvent and said ester.

11. In a process of precipitating tetracycline base in crystalline form from an aqueous tetracycline-containing solution containing at least 5,000 tetracycline units per milliliter and substantially free of calcium ions and other metal ions capable of forming complex compounds with tetracycline, the steps which comprise adding to said tetracycline-containing solution an organic solvent which is at most only slightly miscible with water and di-(2-ethylhexyl)-ortho-phosphoric acid dissolved in said organic solvent, and adjusting the pH-value of the aqueous solution to about 3–8, whereafter after crystalline tetracycline base separates.

12. In a process of precipitating tetracycline base in crystalline form from an aqueous tetracycline-containing solution containing at least 5,000 tetracycline units per milliliter and substantially free of calcium ions and other metal ions capable of forming complex compounds with tetracycline, the steps which comprise adding to said tetracycline-containing solution an organic solvent which is at most only slightly miscible with water and dinonyl-ortho-phosphoric acid dissolved in said organic solvent, and adjusting the pH-value of the aqueous solution to about 3–8, whereafter crystalline tetracycline base separates.

No references cited.

NICHOLAS S. RIZZO, *Primary Examiner.*
JAMES W. ADAMS, JR., *Assistant Examiner.*